May 26, 1959 W. J. KATZ 2,888,091
GAS ABSORPTION APPARATUS
Filed Sept. 9, 1957
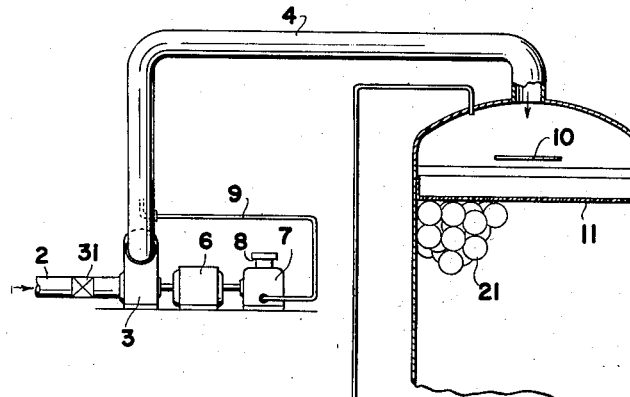
FIG. 1.
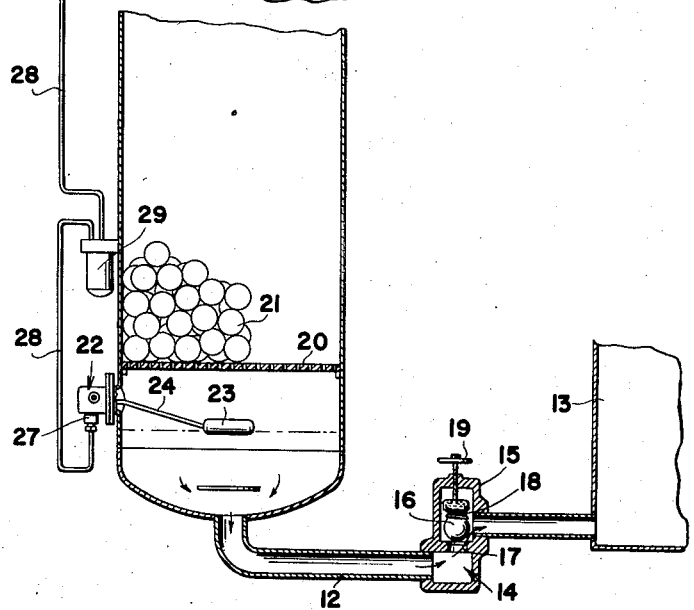
FIG. 2.
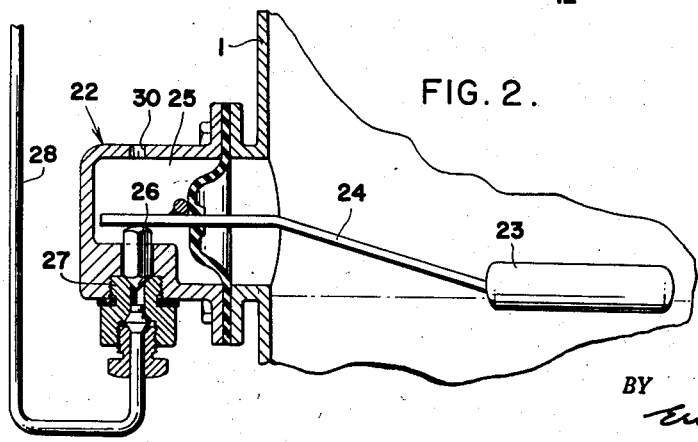
INVENTOR.
WILLIAM J. KATZ
BY
ATTORNEY

# United States Patent Office 2,888,091
Patented May 26, 1959

2,888,091

GAS ABSORPTION APPARATUS

William J. Katz, Fox Point, Wis., assignor to Chain Belt Company, a corporation of Wisconsin Application September 9, 1957, Serial No. 682,924

4 Claims. (Cl. 183—2)

This invention relates to apparatus for dissolving a gas in a liquid and for releasing the same as in a tank adapted for the separation of solids carried in suspension in the tank.

According to the invention, a quantity of liquid and gas is introduced under pressure in a tank having a series of baffles over which the liquid flows to absorb the gas contained within the tank. The liquid with the gas in solution collects in the lower portion of the tank for discharge through the pressure regulating means located adjacent to the separation tank. As the pressure is reduced the gas comes out of solution and forms an infinite number of finely divided gas bubbles for adsorption by the solids in suspension in the separation tank.

The present invention is directed to the arrangement of the absorption tank and to control means for regulating the relative amounts of air and liquid contained within the tank to maintain a given supply of liquid in the bottom of the tank at all times so that no gas is able to reach the valve and disrupt its operation.

The principal object of the invention is to provide efficient and dependable apparatus for placing air into solution.

Another object of the invention is to prevent free air from reaching either the pressure reducing valve or the flotation tank which would interfere with their operation.

Another object is to provide dependable regulation of the supply of liquid within the tank.

Another object is to maintain the efficiency of the absorption including immediately upon resuming operation after a period of shut-down.

The drawings furnished herewith illustrate the best mode of carrying out the invention as presently contemplated and set forth hereinafter.

In the drawings:

Figure 1 is a central vertical section of the tank and with the air and gas pumps and the pressure reducing means shown diagrammatically. The pressure reducing means is connected to one end of a separation tank shown in part; and Fig. 2 is an enlarged, detailed cross-section of the air control valve.

The cylindrical tank 1 is disposed upright and includes suitable means, not shown, for access to the interior of the tank. The liquid delivery line 2 is connected to the intake end of the pump 3 and the pipe 4 connects the discharge end of the pump with the upper end of tank 1. The motor 6 driving pump 3 is also connected to the air compressor 7 having an air inlet 8 and an air delivery line 9. The air line 9 opens into pipe 4 near pump 3 to inject air into the stream for absorption by the liquid.

Pipe 4 opens downwardly into the upper end of tank 1 to direct the stream against the horizontal baffle 10 which dissipates the velocity energy of the flow and distributes the flow over the area of the perforate pan 11 located below baffle 10. To assure the horizontal distribution of the liquid in normal operation, the perforations are such that a shallow pool of liquid is maintained which divides the tank into upper and lower zones.

The pipe 12 from the lower end of tank 1 connected to the flotation unit 13, shown in part, is provided with the reducing valve 14 shown diagrammatically. Valve 14 includes the valve body 15 and the movable member 16 which cooperates with the valve opening 17 in the body to restrict the flow of liquid from tank 1 to tank 13 and provides the pressure reduction of the flow which results in the transformation of some of the absorbed gas into an infinite number of small gas bubbles providing the desired flotation of the suspended solids in tank 13.

The pressure reduction referred to should be constant but subject to adjustment as desired. Various pressure regulation means may be provided to operate in the manner of the spring 18 shown which biases movable member 16 to close the valve with a given degree of force as determined by the manually operable screw adjustment 19.

The grate 20 spaced above the lower end of tank 1 supports the non-absorbent, inert material 21 which fills the intermediate zone of the tank extending from grate 20 up to the pan 11. The liquid delivered to the tank passes through pan 11 and cascades downwardly over the material 21 which provides a maximum area of contact between the liquid and the air within the tank. The pressure within tank 1 as maintained by valve 14 within the capacity of pump 3 and the area of contact between the air and the liquid determines the rate of absorption of the air by the liquid and the ability of the tank to handle large quantities of air and liquid in a given period of time.

A quantity of the liquid with absorbed air is maintained in the bottom of tank 1 so that no free air is allowed to reach the entry to pipe 12 or to pass through valve 14 to tank 13. Such free air in large quantities causes unwanted agitation and turbulence in tank 13 and disrupts its operation.

However, the quantity of liquid maintained within tank 1 should also not be so great as to submerge the material 21 and reduce the effective area of contact between the air and liquid. The regulation of the liquid level within the bottom of tank 1 and below grate 20 is effected by the air valve 22 fixed to the side of tank 1 with the float 23 carried by one end of arm 24 so as to be disposed below grate 20 within the tank. Arm 24 extends through the flexible diaphragm which closes the opening in the wall of the tank necessary for the introduction of the float and for the necessary movement of the arm. The other end of arm 24 is pivoted within the body 25 of valve 22 to move the needle 26 which seats in the lower end of the fitting 27 threaded in valve body 25. One end of the pressure-relief line 28 is connected to the top of tank 1 and the other end is secured by fitting 27 to be opened and closed by needle 26.

In the operation of the system, motor 6 drives pump 3 and compressor 7 to deliver liquid and air to tank 1 through pipe 4. The air is introduced into pipe 4 by air line 9 so that the air and liquid are commingled in pipe 4 and a certain amount of air may be dissolved in the liquid before reaching tank 1.

The liquid entering the tank passes through pan 11 and flows in a large number of individual streams over material 21 and through grate 20 and remerges in a pool in the bottom of tank 1 below grate 20.

The air entering tank 1 from pipe 4 occupies the remaining space within the tank and particularly throughout material 21 so that a maximum rate of absorption is obtained at the pressure maintained within the tank by valve 14.

To assure an adequate supply of air at the maximum rate of absorption, an excess amount of air is supplied by compressor 7 and valve 22 is arranged to prevent the excess accumulation of air in tank 1.

When float 23 is supported in its uppermost position by the liquid pool in the tank, arm 24 holds needle 26 to keep fitting 27 and pressure relief line 28 closed. If for some reason the supply of air is reduced, valve 14 will necessarily close slightly increasing the volume of liquid in the tank. A large quantity of liquid may submerge float 23 but will hold valve 22 closed and continue to keep relief line 28 closed. The liquid rising above grate 20 may also submerge some of material 21 without interrupting the operation of the tank. When the full air supply is resumed the air will again displace the liquid until the liquid level in tank 1 lowers float 23 and causes valve 22 to open relief line 28.

When line 28 is opened, the air from the top of tank 1 passes through filter 29 interposed in line 28 and exhausts into the atmosphere through the vent 30 in the housing 25 of valve 22. The line 28 is connected to the top of tank 1 where liquid and particularly any solid matter carried by the liquid is the least likely to enter the line. Any foreign particles carried by the air or liquid are intercepted by filter 29 and kept from clogging valve 22 so that the unit will be operative for indefinite periods without attention.

The venting of some of the air from tank 1 effects a reduction in pressure within the tank so that valve 14 automatically functions and closes slightly to reduce the rate of flow of the liquid from the tank so that the maximum rate of absorption may be maintained. The reduced rate of flow continues while the delivery of pump 3 remains unchanged until the quantity of liquid in the bottom of tank 1 is restored and the liquid level again raises the float.

While the rate of delivery of liquid and air by pump 3 and compressor 7 remain fairly constant, valves 14 and 22 operate so that the rate of air supplied and retained in the tank equals the rate of absorption by the liquid.

An important feature of the present invention resides in the fact that when the supply of liquid and air is shut off as by closing valve 31 in pipe 4 upon turning off motor 6, valves 14 and 22 close subsequently and retain in tank 1 both the air and liquid therein under pressure. Accordingly, upon restarting motor 6 and reopening valve 31, the liquid which was stored in tank 1 and initially passes valve 14 has not lost any of its dissolved air while remaining in the tank and does not load flotation tank 13 with unnecessary liquid.

The system of control is dependable in operation and requires no attention. Material 21 breaks the liquid from pan 11 into a large number of small streams which cascade downwardly through tank 1 to provide a large interface or area between the liquid and air within the tank so that the maximum rate of absorption is maintained at all times and the liquid leaving the tank always carries the maximum amount of dissolved air as determined by pressure and temperature factors. When valve 22 opens, the air within tank 1 moves upwardly through material 21 and around pan 11 or through any one or more of the holes in the pan to enter line 28 for release through vent 30.

Air compressor 7 does not need to be driven by motor 6 and air line 9 with suitable pressure regulation means, not shown, may instead be connected to an existing or other available source of air under pressure.

Various modes of carrying out the invention are contemplated as being within the scope of the following claims particularly pointing out and distinctly claiming the subject matter which is regarded as the invention.

I claim:

1. In combination with apparatus for flotation of solids in a liquid by adsorbed air, means for delivery of a liquid and air under pressure, a closed tank connected to said delivery means and including an upper inlet for the delivered liquid and means in the upper part of the tank for distributing horizontally the liquid entering the tank, said last named means being spaced from the top of the tank to allow the air released in the tank to collect at the top thereof, a series of baffles intermediate said upper and the lower part of the tank and providing an interface between the liquid and air for maximum absorption of the air by the liquid passing from the upper to the lower part of the tank, said lower part of the tank being adapted to retain a quantity of the liquid with absorbed air and having a lower discharge outlet including a conduit and a regulating valve subject and responsive to the pressure in the tank and disposed to close the conduit as said pressure approaches a predetermined minimum value, means for exhausting excess air from the tank and including a vent line from the top of the tank and a float valve controlling said vent line, the float being movable between upper and lower positions in said lower part of the tank in response to changes in the level of the retained liquid therein, the valve being closed by the float in its upper position and being open with the float in its lower position, said regulating valve and float valve having corresponding intermediate positions and being thereby cooperative to control the discharge of liquid with absorbed air from said tank through said conduit with a reduction in pressure and release of the air in the form of minute bubbles for flotation of solids at a uniform rate.

2. In a tank having an upper zone for receiving air and a liquid under pressure and a lower zone for retaining a quantity of the liquid with air dissolved therein, a series of baffles supported within the tank intermediate said upper and lower zones and providing a large surface area over which the liquid flows by gravity from the upper to the lower zone, said tank having valve controlled discharge means from the lower zone thereof responsive to the pressure within the tank and operative to maintain a given pressure in the tank, and a controlled air vent from said upper zone of the tank and responsive to the level of the liquid in the lower zone, said vent being closed when the level of the liquid is above a given point located below said series of baffles, and said vent being open when the level of the liquid is below said point, the opening of said vent being effective to reduce the pressure within the tank and the partial closing of said discharge means in response thereto, such partial closing of said discharge means being continued until the pressure in the tank is reestablished by the air and liquid delivered to the tank and the level of the liquid in the lower zone of the tank goes above the point referred to and said vent reopens.

3. In combination with apparatus for the air flotation of solids in a liquid, a liquid supply line and means for delivery of air and the liquid under pressure, a closed tank connected to said delivery means and including an upper inlet for the liquid and air, deflector means in the upper part of the tank for distributing horizontally the liquid entering the tank, a series of baffles intermediate said upper and the lower part of the tank and providing an interface between the liquid and air for maximum absorption of the air by the liquid passing from the upper to the lower part of the tank, said lower part of the tank being adapted to retain a quantity of the liquid with absorbed air and having a lower discharge outlet, a conduit connecting said outlet and said apparatus and having a regulating valve subject and responsive to the pressure in the tank and disposed to close the conduit as said pressure approaches a predetermined minimum value, means for venting excess air from the tank and including a conduit connected to and defining a passage from the top of said tank above said deflector means and a float valve controlling said passage, the float being movable between upper and lower positions in said lower part of the tank in response to changes in the level of the retained liquid therein, the valve being closed by the float in its upper position and being open with the float in its lower position, said regulating valve and float valve being thereby cooperative to control the discharge of liquid with absorbed air from said tank through said conduit with a reduction in pressure and release of the air in the form of minute bubbles for flotation and separation of solids by said apparatus receiving the same.

4. Apparatus for dissolving air in a liquid and in combination with a source of air under pressure, comprising means for the delivery of the liquid under pressure and including a conduit having a connection with said source of air, a closed tank connected to said conduit and including an upper inlet for the liquid and air, deflector means in the upper part of the tank disposed to distribute horizontally the liquid entering the tank, a series of baffles intermediate said upper and the lower part of the tank and providing an interface between the liquid and air for maximum absorption of the air by the liquid passing from the upper to the lower part of the tank, said lower part of the tank being adapted to retain a quantity of the liquid with absorbed air and having a lower discharge outlet and a regulating valve subject and responsive to the pressure in the tank and disposed to close the outlet as said pressure approaches a predetermined minimum value, and a float valve having a conduit connected to the top of the tank above said deflector and a vent to the atmosphere for controlling the volume of air from said source and in the tank, the float being movable between upper and lower positions in said lower part of the tank in response to changes in the level of the retained liquid therein, the valve and vent being closed by the float in its upper position and being open with the float in its lower position, said regulating valve and float valve being thereby cooperative to control the discharge of liquid with absorbed air from said tank through said outlet with a reduction in pressure and release of the air in the form of minute bubbles as for the separation of solids by flotation.

References Cited in the file of this patent

UNITED STATES PATENTS

| | | |
|---|---|---|
| 2,348,357 | Parks | May 9, 1944 |
| 2,596,692 | Jordan | May 13, 1952 |